United States Patent
Koch

(10) Patent No.: US 9,152,178 B2
(45) Date of Patent: Oct. 6, 2015

(54) ENVIRONMENTAL CONTROLS FOR MOBILE ELECTRONIC DEVICES

(71) Applicant: SYMBOL TECHNOLOGIES, INC., Schaumburg, IL (US)

(72) Inventor: Thomas Koch, Mississauga (CA)

(73) Assignee: Symbol Technologies, LLC, Holtsville, NY (US)

( * ) Notice: Subject to any disclaimer, the term of this patent is extended or adjusted under 35 U.S.C. 154(b) by 213 days.

(21) Appl. No.: 14/073,164

(22) Filed: Nov. 6, 2013

(65) Prior Publication Data
US 2015/0124390 A1  May 7, 2015

(51) Int. Cl.
*G06F 1/16* (2006.01)
*H05K 5/00* (2006.01)
*H05K 7/00* (2006.01)

(52) U.S. Cl.
CPC .................... *G06F 1/1633* (2013.01)

(58) Field of Classification Search
CPC .................................................. A06F 1/1633
USPC ............... 361/679.26, 679.3, 679.55, 679.56, 361/688–723
See application file for complete search history.

(56) References Cited

U.S. PATENT DOCUMENTS

| 5,934,368 | A | 8/1999 | Tanaka et al. |
| 6,422,062 | B1 | 7/2002 | King et al. |
| 6,508,408 | B2 | 1/2003 | Kelly et al. |
| 6,697,645 | B1 | 2/2004 | MacFarlane |
| 6,886,351 | B2 * | 5/2005 | Palfy et al. ........................ 62/140 |
| 2002/0140848 | A1 | 10/2002 | Cooper et al. |
| 2005/0106046 | A1 * | 5/2005 | Winkler ..................... 417/423.3 |
| 2006/0141945 | A1 | 6/2006 | Korhonen et al. |
| 2007/0004449 | A1 | 1/2007 | Sham |
| 2008/0061157 | A1 * | 3/2008 | Grosskopf et al. .......... 236/44 C |
| 2008/0132213 | A1 | 6/2008 | Rittman et al. |
| 2008/0303637 | A1 | 12/2008 | Gelbman et al. |
| 2014/0355649 | A1 * | 12/2014 | Niederberger et al. ....... 374/152 |
| 2015/0116507 | A1 * | 4/2015 | Sagerian et al. .............. 348/189 |

FOREIGN PATENT DOCUMENTS

| EP | 1311147 B1 | 11/2010 |
| EP | 2398104 B1 | 3/2013 |
| WO | 2007041165 A2 | 4/2007 |
| WO | 2012097460 A1 | 7/2012 |

* cited by examiner

Primary Examiner — Anthony Haughton
Assistant Examiner — Yahya Ahmad

(57) ABSTRACT

A mobile computing device is described. The mobile computing device includes an enclosure. A humidity sensor senses humidity inside the enclosure and generates humidity data. An internal temperature sensor senses a temperature inside the enclosure and generates internal temperature data. An external temperature sensor senses a temperature exterior to the enclosure and generates external temperature data. An environmental control apparatus adjusts at least a temperature inside the enclosure of the mobile electronic device. A processor receives the humidity data, the internal temperature data, and the external temperature data and activates the environmental control apparatus in response to the humidity data, the internal temperature data, and the external temperature data to minimize condensation from forming inside the enclosure due to rapid changes in external ambient temperature.

18 Claims, 5 Drawing Sheets

ENVIRONMENTAL CONTROLS FOR MOBILE ELECTRONIC DEVICES

TECHNICAL FIELD

The present invention relates generally to mobile computing devices, and more specifically to environmental controls for mobile computing devices.

BACKGROUND

Mobile computers, including handheld devices, data collection devices and vehicle mount computers are used in an increasingly wide range of applications and environments. In some environments, the mobile computers can be exposed to rapid transitions in temperature and humidity ranging from (−30° C. to +60° C.) and anywhere from (10% to 100%) in relative humidity. This has a direct impact on the performance of mobile computing devices and can cause fogging and/or frosting of display windows, scanner/imager exit windows and keypad freezing, which prevents use of the devices and a build-up of moisture internal to the devices which can lead to component failure and/or corrosion. The problem can be especially acute in the area of devices for "cold" supply chain logistics (SCL) which are subject to repeated and rapid changes in temperature where, for example, the device may be repeatedly moved between sub-zero, dry environments (such as refrigerated warehouses) and hot, damp environments (such as loading docks, etc.).

BRIEF DESCRIPTION OF THE FIGURES

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The above and further advantages of this invention may be better understood by referring to the following description in conjunction with the accompanying drawings, in which like numerals indicate like structural elements and features in various figures. Skilled artisans will appreciate that reference designators shown herein indicate components shown in a figure other than the one in discussion. For example, talking about a device 10 while discussing Figure A would refer to an element, 10, shown in figure other than Figure A.

DETAILED DESCRIPTION

Figure 1:
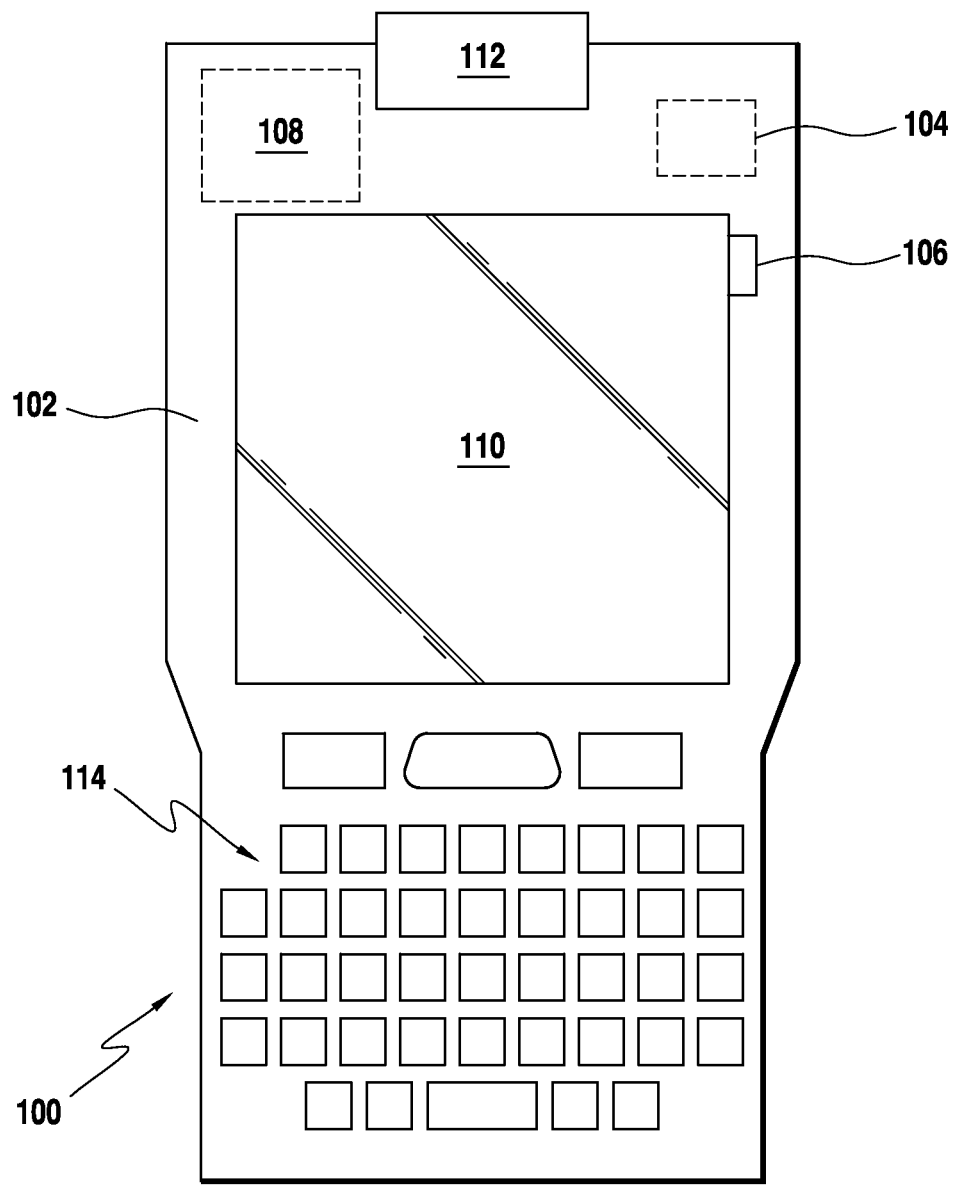
FIG. 1 depicts a mobile computer with environmental controls, in accordance with an embodiment of the present invention.

The following detailed description is merely illustrative in nature and is not intended to limit the invention or the application and uses of the invention. Furthermore, there is no intention to be bound by any express or implied theory presented in the preceding technical field, background, brief summary or the following detailed description. For the purposes of conciseness, many conventional techniques and principles related to the operation of mobile computing devices, need not, and are not, described in detail herein.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example, instance, or illustration" rather than "model," or "deserving imitation."

Technologies and concepts discussed herein relate to mobile computing devices. According to one embodiment, a mobile device includes an enclosure. A humidity sensor senses humidity inside the enclosure and generates humidity data. An internal temperature sensor senses a temperature inside the enclosure and generates internal temperature data. An external temperature sensor senses a temperature exterior to the enclosure and generates external temperature data. An environmental control apparatus adjusts at least a temperature inside the enclosure of the mobile electronic device. A processor receives the humidity data, the internal temperature data, and the external temperature data and activates the environmental control apparatus in response to the humidity data, the internal temperature data, and the external temperature data to minimize condensation from forming inside the enclosure due to rapid changes in external ambient temperature.

The mobile device can also include one or more heaters and/or humidity control devices, such as micro-fans for exchanging air with the external environment. In a preferred embodiment, the mobile device includes a data acquisition device, such as a barcode scanner or imager, and a display, such as a liquid crystal display (LCD). The display can be a touch screen display.

FIG. 1 illustrates a mobile computing device 100 having environmental controls, in accordance with one embodiment of the present invention. Mobile computing device 100 includes an enclosure 102, at least one internal environmental sensor 104 enabled to sense one or more internal environmental factors interior to enclosure 102, at least one external environmental sensor 106 enabled to sense one or more external environmental factors exterior to enclosure 102, and at least one environmental control apparatus 108 enabled to adjust one or more environmental factors of the mobile computing device 100. The internal environmental sensor 104 and the external environmental sensor 106 will also respectively be referred to hereafter as internal sensor and external sensor. In one embodiment, the internal environmental sensor(s) 104 can include a humidity sensor and a temperature sensor. The external environmental sensor(s) 106 can include a temperature sensor. In one embodiment, the external environmental sensor 106 can be positioned at least partially inside the enclosure 102. For example, the external environmental sensor 106 can be located on the inside surface of a scanner window (not shown). In this embodiment, the external environmental sensor 106 can detect the temperature of the scanner window. Skilled artisans will appreciate that the ambient temperature of the environment external to the enclosure 102 can be determined by measuring the temperature of the scanner window with the external environmental sensor 106. Additionally, in this embodiment, the external environmental sensor 106 is protected from contamination from the external environment. The mobile computing device 100 can also include a display 110, a data acquisition device or scanner 112, and a keypad 114.

Figure 2:
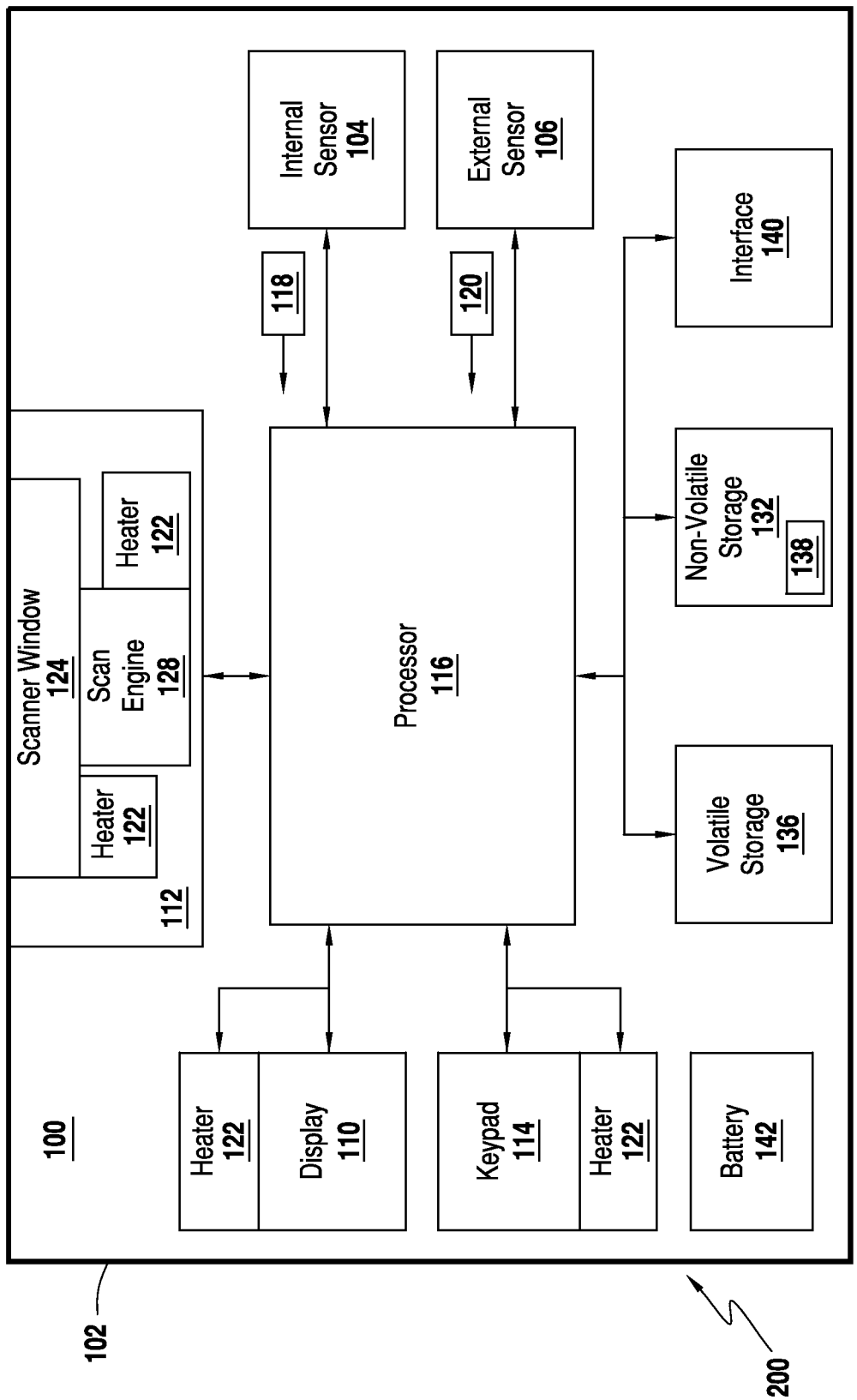
FIG. 2 depicts a block diagram of components of the mobile computer of FIG. 1.

FIG. 2 illustrates a block diagram 200 of the mobile computing device 100 of FIG. 1. The mobile computing device 100 includes a processor 116. The processor 116 can include any suitable processor, such as an OMAP 3 microprocessor as manufactured by Texas instruments or equivalent. The processor 116 is configured to receive internal environmental data 118, such a humidity data and internal temperature data, from the internal environmental sensor(s) 104. The processor 116 can also receive external environmental data 120, such a temperature data, from the external environmental sensor 106.

The internal environmental data 118 (also referred to hereafter as internal data) is indicative of the one or more internal environmental factors, such as internal temperature and internal humidity of the enclosure 102 of the mobile device 100. The external environmental data 120 (also referred to hereafter as external data) is indicative of the one or more external environmental factors, such as the external temperature. Processor 116 is further configured to activate one or more heaters 122 based on internal environmental data 118 and external environmental data 120.

For example, each of internal environmental sensor 104 and external environmental sensor 106 can include one or more of a temperature sensor and a humidity sensor. The internal environmental sensor 104 and the external environmental sensor 106 can sense environmental factors, such as temperature and humidity, inside and external to the mobile computing device 100. The processor 116 can receive the environmental factors for the sensors 104, 106 and calculate temperature differences, temperature changes, humidity differences, humidity changes, or the like. In addition, the processor 116 can activate the heaters 122 to prevent freezing and/or condensation from forming on the components of the mobile computing device 100.

For example, the humidity data and the internal temperature data can be used by the processor 116 to determine a dew-point temperature inside the enclosure 102. The dew-point temperature is a measure of the temperature below which water vapor in a volume of humid air at a given constant barometric pressure will condense into liquid water at the same rate at which it evaporates. Thus, the dew-point temperature can indicate when condensed water forms on internal components of the mobile computing device 100.

In some embodiments, the mobile computing device 100 further includes the display 110, the keypad 114 and the scanner 112. The scanner 112 can include a scanner window 124 and a scan engine 128. The scanner 112 is generally configured to read optically encoded data, such as one dimensional (1D) or two dimensional (2D) barcodes, or the like.

In one embodiment, the freezing of one or more of the components of the mobile computing device 100 can impede the operation of the device 100. In one embodiment, heaters 122 are configured to heat each of the display 110 and/or a window of the display 110, the keypad 114, the scanner window 124 and the scan engine 128 when activated by the processor 116.

The mobile computing device 100 of FIG. 2 can be used to collect data via the keypad 114, the scanner 112, an RFID reader (not shown), etc. The mobile computing device 100 can embody a handheld data collection device or a vehicle mounted device, for example. The mobile computing device 100 includes the enclosure 102. The enclosure 102 can be any suitable shape, configuration, and can be fabricated from any suitable material(s). The enclosure 102 can support various components of the mobile computing device 100.

The device 100 includes at least one input device generally enabled to receive input data. The input device can include a keypad 114. In practice, the device 100 can include any suitable combination of input devices, including but not limited to a keyboard, a keypad, a pointing device, a mouse, a trackball, a touch screen and the like. In practice, any suitable input device can be used.

In operation, a user provides input to the keypad 114 that is received at the processor 116. The processor 116 is configured to communicate with a non-volatile storage unit 132 (e.g., Erasable Electronic Programmable Read Only Memory ("EEPROM"), Flash Memory) and a volatile storage unit 136 (e.g., random access memory ("RAM")). Programming instructions that implement the functional teachings of device 100 as described herein are typically maintained, persistently, in non-volatile storage unit 132 and used by processor 116 which makes appropriate utilization of volatile storage 136 during the execution of such programming instructions. Those skilled in the art will recognize that non-volatile storage unit 132 and volatile storage 136 are examples of computer readable media that can store programming instructions executable on processor 116. Furthermore, non-volatile storage unit 132 and volatile storage 136 are also examples of memory units and/or memory modules.

In addition to program instructions and/or other data, non-volatile storage unit 132 can store data 138 including predetermined values for activating at least one environmental control apparatus, such as heaters 122. In some implementations, data 138 can be in the form of a lookup table. However, it is appreciated that data 138 can be in any suitable format. Data 138 can further include ranges of operating temperatures of device 100, threshold operating temperature of device 100, ranges of operating humidity of device 100, threshold operating humidity of device 100 and the like.

Data 138 can further include operating parameters for at least one environmental control apparatus, such as heaters 122. For example, such operating parameters can comprise a length of time to operate a given heater 122 and an operating power level of a given heater 122. Such operating parameters can be associated with given values for data 118 and/or data 120 in a lookup table or the like.

The processor 116 can also be configured to communicate with the display 110, internal sensor(s) 104, external sensor(s) 106, and scanner 112. The display 110 can include a CRT (cathode ray tube) or a flat panel display (e.g., LCD (liquid crystal display), plasma, OLED (organic light emitting diode), capacitive or resistive touchscreens, and the like).

In some embodiments, for example, in which the device 100 includes a vehicle mount computer, the keypad 114 and the display 110 can be external to the device 100, and the processor 116 can communicate with each of the keypad 114 and the display 110 via a suitable connection and/or communication link.

The processor 116 can also connect to a network communication interface 140, also referred to hereafter as interface 140, which can be implemented in a variety of ways. For example, in some implementations, the interface 140 can include one or more radios configured to communicate with other computing and/or storage devices over a communication network (not shown) in order to transfer data collected by the scanner 112 to a remote device (not shown).

As previously described, the internal sensor 104 can include a temperature sensor and/or a humidity sensor and the external sensor 106 can include a temperature sensor and/or humidity sensor. In one embodiment, the internal sensor 104 can sense one or more environmental factors interior to enclosure 102, such as a temperature inside enclosure 102 and/or humidity inside enclosure 102.

The internal sensor 104 can be positioned in any suitable location within the enclosure 102. In one embodiment, the internal sensor 104 is positioned inside enclosure 102 so as to sense temperature and/or humidity of one or more of the display 110, the keypad 114, the scanner window 124 and the scan engine 128. Skilled artisans will appreciate that the internal sensor 104 can be enabled to sense environmental factors of the components of the device 100 that may be sensitive to changes in temperature/humidity and/or extremes of temperature/humidity inside the enclosure 102.

In one embodiment, the external sensor 106 can be located to sense temperature and/or humidity external to enclosure 102 proximal to one or more of the display 110, the keypad 114, scanner window 124 and scan engine 128. Skilled artisans will appreciate that the external sensor 106 can be configured to sense external environmental factors proximal to the components of device 100 that are sensitive to changes in temperature/humidity and/or extremes of temperature/humidity.

In one embodiment, a portion of external sensor 106 can be positioned at least partially inside the enclosure 102. For example, the external sensor 106 can sense external environmental factors through an aperture (not shown) in the enclosure 102. In practice, the external sensor 106 can be located anywhere on the mobile computing device 100 so long as it can be configured to sense external environmental factors.

The scanner 112 can embody any suitable scanner for acquiring desired data, including but not limited to an optical scanner or a barcode imager. In one embodiment, an RFID reader module (not shown) can also be integrated with the mobile computing device 100. In one embodiment, the scanner 112 includes the scanner window 124 behind which is located the scan engine 128. The scan engine 128 can include a lens and a light sensor translating optical impulses into electrical signals.

The heaters 122 can embody any suitable heater or a variety of different types of heaters. For example, the heater 122 can include a ceramic heater, a resistive wire heater and/or an electrically conductive coating (including, but not limited to, a coating of Indium Tin Oxide and the like) applied to, or adjacent to, screens, windows, keypads and the like.

The mobile computing device 100 can also include a power source, such as battery 142 and/or a connection to an external power source (not shown). The battery 142 can be a rechargeable battery, such as a lithium-ion or nickel-cadmium battery.

Skilled artisans will appreciate that the mobile computing device 100 can include other components depending on a configuration of hardware and software executing thereon. For example, the mobile computing device 100 can include other suitable components including, but not limited to, a real time clock, radio transceivers, antennas, and other input/output (I/O) components (not shown).

Figure 3:
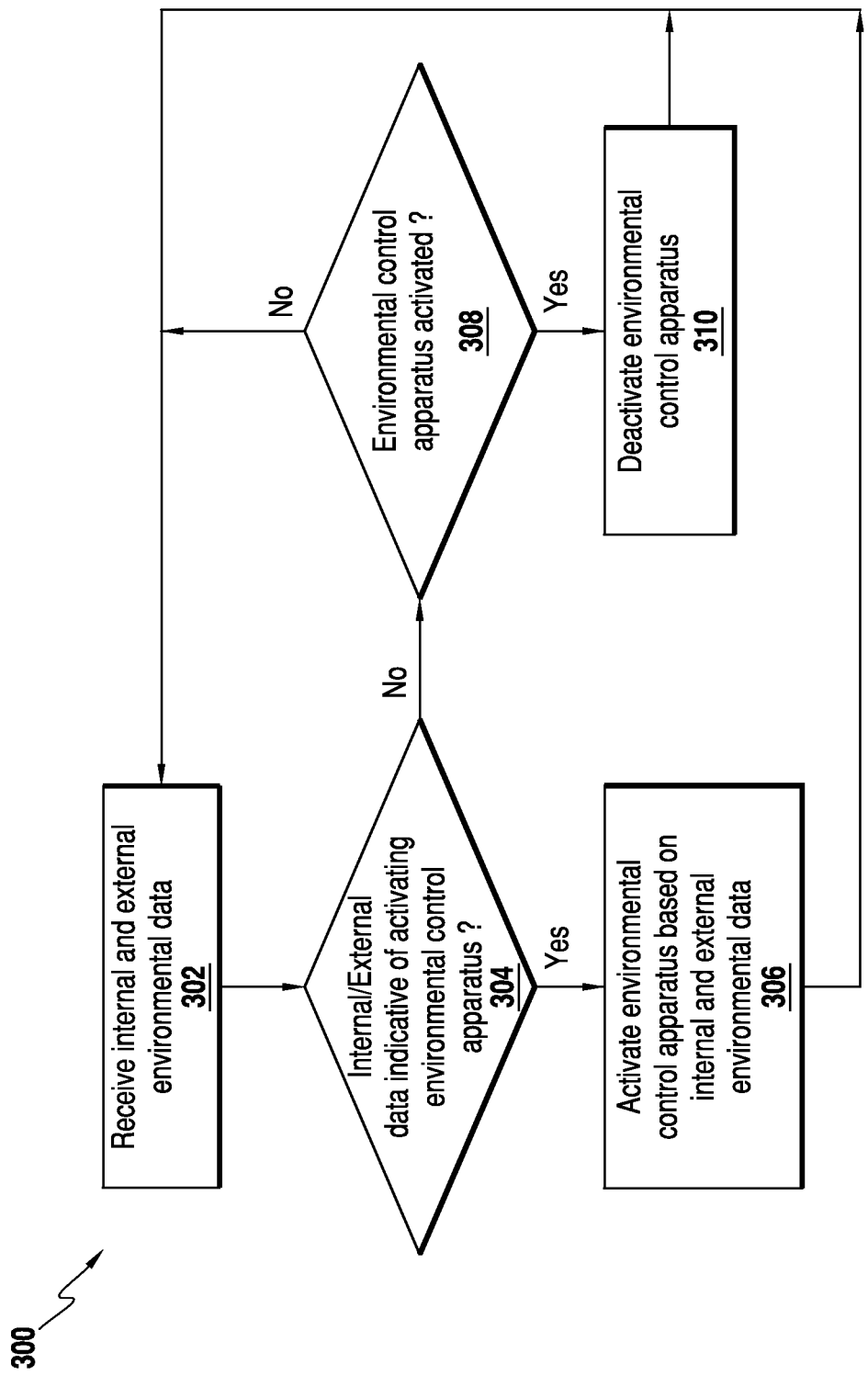
FIG. 3 depicts a method for controlling an internal environment of the mobile computer of FIG. 1.

FIG. 3 illustrates a method 300 for controlling an internal environment of the mobile computing device 100 (FIG. 1), according to one embodiment. In step 302, the processor 116 receives internal environmental data 118, such as internal temperature and humidity, from the internal sensor 104. The processor 116 also receives external environmental data 120, such as external temperature, from the external sensor 106. The processor 116 can receive the data 118, 120, continuously, periodically, or only when requested by the processor 116.

In one embodiment, the operation of the internal sensor 104 and the external sensor 106 are configurable. For example, the sampling rates for the internal sensor 104 and external sensor 106 can be configured, by either processor 116 or by provisioning each of internal sensor 104 and external sensor 106, individually. In alternate embodiments, the sampling rates for the internal sensor 104 and the external sensor 106 can be constant or can vary, for example, based on changes in environmental factors (e.g., sampling rates can be increased as changes in temperature and/or humidity increase). In one embodiment, respective sampling rates of the internal sensor 104 and the external sensor 106 can be set in response to environmental factor changes that effect the operation of mobile computing device 100, such as rapid changes in temperature and/or humidity.

In step 304, the processor determines 116 whether environmental control apparatus 108, such as one or more heaters 122, should be activated. In one embodiment, the data 118, 120 can be compared to predetermined values and/or threshold values stored in data 138 to determine whether internal data 118 and/or external data 120 correspond to predetermined criteria for activating the environmental control apparatus 108, such as one or more heaters 122.

For example, the environmental control apparatus 108 can be activated based on any suitable conditions, including but not limited to a difference between the internal environmental data 118 and the external environmental data 120, a comparison of the internal environmental data 118 and previous internal environmental data, a comparison of the internal environmental data 118 and an operating environmental factor, including but not limited to an operating temperature and an operating humidity, a comparison of the external environmental data 120 and previous external environmental data, and a comparison of the external environmental data 120 and the operating environmental factor. For example, one or more heaters 122 can be activated when one or more of these comparisons correspond to an associated threshold value. In one embodiment, the rate at which a change in an environmental factor occurred can also be considered by the processor 116 when activating the environmental control apparatus 108.

In one embodiment, where the environmental control apparatus 108 includes one or more heaters 122 that are activated based on a difference between internal data 118 and previous internal environmental data, and/or a difference between external data 120 and previous external environmental data, it should be noted that non-volatile storage 132 can store a history of the internal data 118 and the external data 120. In some embodiments, a given number of historical values of each of internal data 118 and external data 120 can be stored in the non-volatile storage 132. In one example, the last ten historical values of internal data 118 and external data 120 can be stored. However, any suitable number of historical values can be stored. In one embodiment, historical values of internal data 118 and external data 120 can be stored such that trends in temperature and/or humidity can be determined. Examples of such trends can include, but are not limited to, rates of change of environmental factors, such as temperature and/or humidity, and/or determining whether an environmental factor is decreasing or increasing.

In one embodiment, when one or more conditions are met at step 304, the processor 116 activates environmental control apparatus 108 (step 306), such as one or more heaters 122 based on the internal environmental data 118 and the external environmental data 120 to control an internal environment of the mobile computing device 100. For example, when a temperature difference between the internal environment and the external environment of the mobile device 100 of sufficient magnitude occurs, the environmental control apparatus 108 can be activated to control condensation and/or frost from forming on components of the mobile computing device 100.

In one embodiment, steps 302, 304, and 306 are repeated, for example in a loop, until a condition for activating the environmental control apparatus 108 is no longer met by the internal data 118 and the external data 120.

In step 308, the processor 116 determines if the environmental control apparatus 108 is activated. In step 310, the processor 116 deactivates the environmental control apparatus 108. For example, the environmental control apparatus 108, such as one or more heaters 122, can be activated until the internal sensor 104 senses that a predetermined operating temperature and a predetermined operating humidity inside the enclosure 102 of the mobile computing device 100 corresponds to a predetermined environmental factor. For example, the display 110 can be heated by heater 122 to a predetermined display operating temperature stored in data 138, the keypad 114 can be heated by heater 122 to a predetermined keypad operating temperature, and/or scanner 112 can be heated by heater 122 to a predetermined scanner operating temperature. In one embodiment, the scanner window 124 can be heated to a scanner window operating temperature which can be different than a scan engine operating temperature of the scan engine 128.

In one embodiment, the processor 116 regulates the environmental control apparatus 108 until the environmental factors approach predetermined values. For example, steps 302, 304 and 306 are repeated until the environmental control apparatus 108, such as one or more heaters 122, are repeatedly activated and deactivated to compensate for changes in temperature and humidity inside the enclosure 102.

In one embodiment, only steps 302 and 306 are performed. In this embodiment, the processor 116 can activate the environmental control apparatus, such as one or more heaters 122, for one or more of a predetermined time period and with a predetermined operating parameter. For example, one or more heaters 122 can be operated for a given time period, such as for five minutes, and at a given power level, such as at five watts. These operating parameters can be implemented using a variety of suitable techniques, such as through pulse width modulation (PWM) of power to the heaters 122. The operating time period and given power level can further depend on data 118, 120, such that given temperature differences and/or humidity values are associated with certain given time periods and given power levels. Hence, when data 118, 120 indicate a change in temperature and/or humidity is within a given range, as stored in data 138, one or more heaters 122 can be activated to a given power level for a given period of time. Therefore, as temperature differences increase, power levels and/or periods of time of heaters 122 can be increased, and as temperature differences decrease, power levels and/or periods of time of heaters 122 can be decreased.

Once the environmental control apparatus 108, such as one or more heaters 122, is deactivated after the given period of time, the processor 116 can process the data 118, 120 to determine whether to again activate the environmental control apparatus 108.

In one embodiment, each heater 122 can be associated with a different operating parameter, and can be individually controlled by the processor 116. For example, each of heaters 122 can be operated for different periods of time and/or different power levels. In one example, a window for display 110 and/or scanner window 124 can be heated to a higher power and/or for a longer period of time than scan engine 128. In one embodiment, the windows can have a higher heat capacity than components of scan engine 128, and the windows can be more exposed and/or sensitive to external ambient temperature and humidity than scan engine 128.

In one specific embodiment, a method of minimizing condensation from forming on certain components inside the enclosure 102 of the mobile device 100 includes sensing humidity inside the enclosure with the internal sensor 104 and generating humidity data (step 302). The internal sensor 104 can also sense a temperature inside the enclosure 102 and generate internal temperature data. An external sensor 106 can sense a temperature exterior to the enclosure 102 and generate external temperature data. A processor 116 activates the environmental control apparatus 108 when the external temperature exceeds a dew-point temperature inside the enclosure 102 (step 306). The processor 116 regulates the environmental control apparatus 108 to adjust at least the temperature inside the enclosure 102 to minimize condensation from forming inside the enclosure 102 due to rapid changes in the external temperature (steps 302, 304, 306).

In one embodiment, the device 100 includes the external temperature sensor 106 and an internal sensor 104 that senses humidity. The sensors 106, 104 can rapidly detect when the device 100 enters a very cold environment, such as a freezer. One advantage of a rapid detection of the very cold environment is that the device heaters 122 can be activated very quickly to avoid fogging of the display 110 and the scanner windows 124 or icing of the keypad 114 and/or other components.

The external temperature sensor 106 can sense temperature on the exterior surface of the device 100 and detect a rapid drop in temperature or a large negative rate of change of temperature. However, employing point measurements in specific areas of the surface of the housing 102 of the device 100 alone can lead to inaccuracies that can adversely affect decisions of the environmental control apparatus 108.

The use of an internal humidity sensor to detect rapid temperature drop has been found to be quite effective. When the mobile device 100 is subjected to a very cold environment, such as a freezer, there is an initial drop in humidity in the internal spaces of the mobile device 100. This phenomenon is counterintuitive since normally when a closed volume of air is cooled it experiences an increase in relative humidity not a drop in relative humidity. The observed drop in relative humidity is due to the exterior walls of the enclosure 102 of the mobile device 100 cooling much more rapidly than the interior components of the mobile device 100. The inside surfaces of the exterior walls of the enclosure 102 of the mobile device 100 quickly drop below the dew point of the interior air mass and water condenses out of the air onto the interior surfaces of the exterior walls. The de-humidification of the cool walls is what causes the initial drop in relative humidity. As the interior air and the interior components all equalize in temperature over time, the relative humidity in the internal spaces will rise, but the initial transient effect is detected by the internal humidity sensor and used by the environmental control apparatus 108.

Although embodiments have been described in which the at least one environmental apparatus 108 includes one or more heaters 122, it should be noted that the environmental control apparatus can also include one or more humidity control devices, such as micro-fans for exchanging air inside the enclosure.

Figure 4:
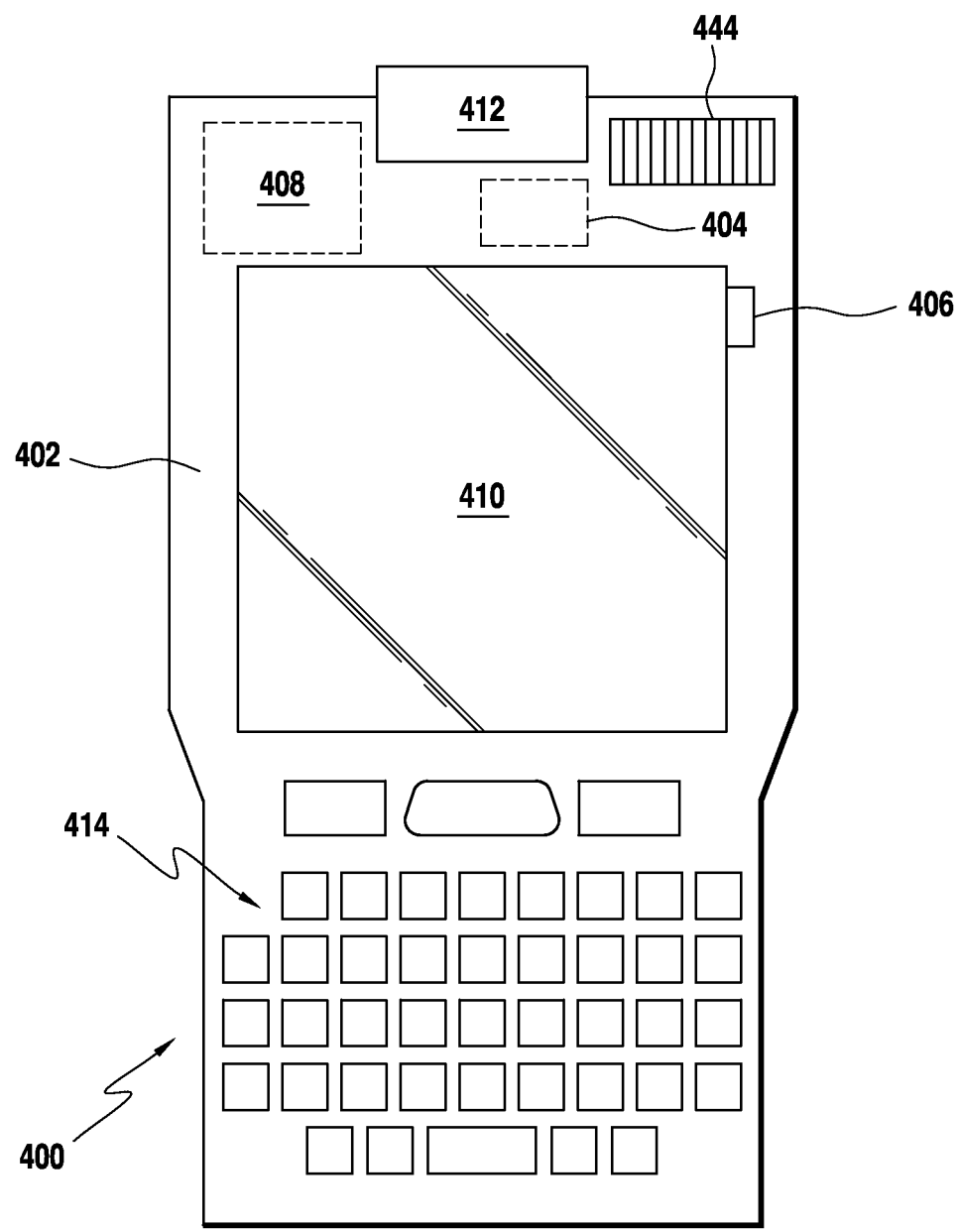
FIG. 4 depicts another mobile computer with environmental controls, in accordance with another embodiment of the present invention.

FIG. 4 illustrates a mobile computing device 400 having environmental controls, in accordance with one embodiment of the present invention. Mobile computing device 400 includes an enclosure 402, at least one internal environmental sensor 404 enabled to sense one or more internal environmental factors interior to enclosure 402, at least one external environmental sensor 406 enabled to sense one or more external environmental factors exterior to enclosure 402, and at least one environmental control apparatus 408 enabled to adjust one or more environmental factors internal to the mobile computing device 400. The internal environmental sensor 404 and the external environmental sensor 406 will also respectively be referred to hereafter as internal sensor and external sensor. In one embodiment, internal environmental sensors 404 can include a humidity sensor and a temperature sensor. The external environmental sensor 406 can include a temperature sensor. In one embodiment, the external environmental sensor 406 can be located at least partially within the enclosure 402. For example, the external environmental sensor 406 can be positioned on the inside surface of a scanner/imager exit window. The mobile computing device 400 can also include a display 410, a data acquisition device 412, and a keypad 414.

In one embodiment, the mobile computing device 400 can include an opening 444 in the enclosure 402 for venting. In one embodiment, the opening 444 can include a filter or valve for allowing air to pass while preventing liquid from entering the enclosure 402. The device 400 is similar to the device 100 of FIG. 1. However, in addition to heaters 422, the environmental control apparatus 408 of device 400 also includes humidity control devices in the form of one or more micro-fans (not shown) for transferring air out of the enclosure 402 through at least one opening 444. In one embodiment, the external sensor 406 can be configured to sense ambient humidity near the opening 444.

Skilled artisans will appreciate that any suitable humidity control device can be used, including but not limited to exhaust mechanisms, micro-pumps, passive venting (such as open shutters) and natural convection. In one embodiment, internal sensor 404 and external sensor 406 are used to determine whether a measure of humidity inside mobile computing device 400 should be controlled such that humid air within enclosure 402 can be exhausted from enclosure 402 via one or more openings 444.

Figure 5:
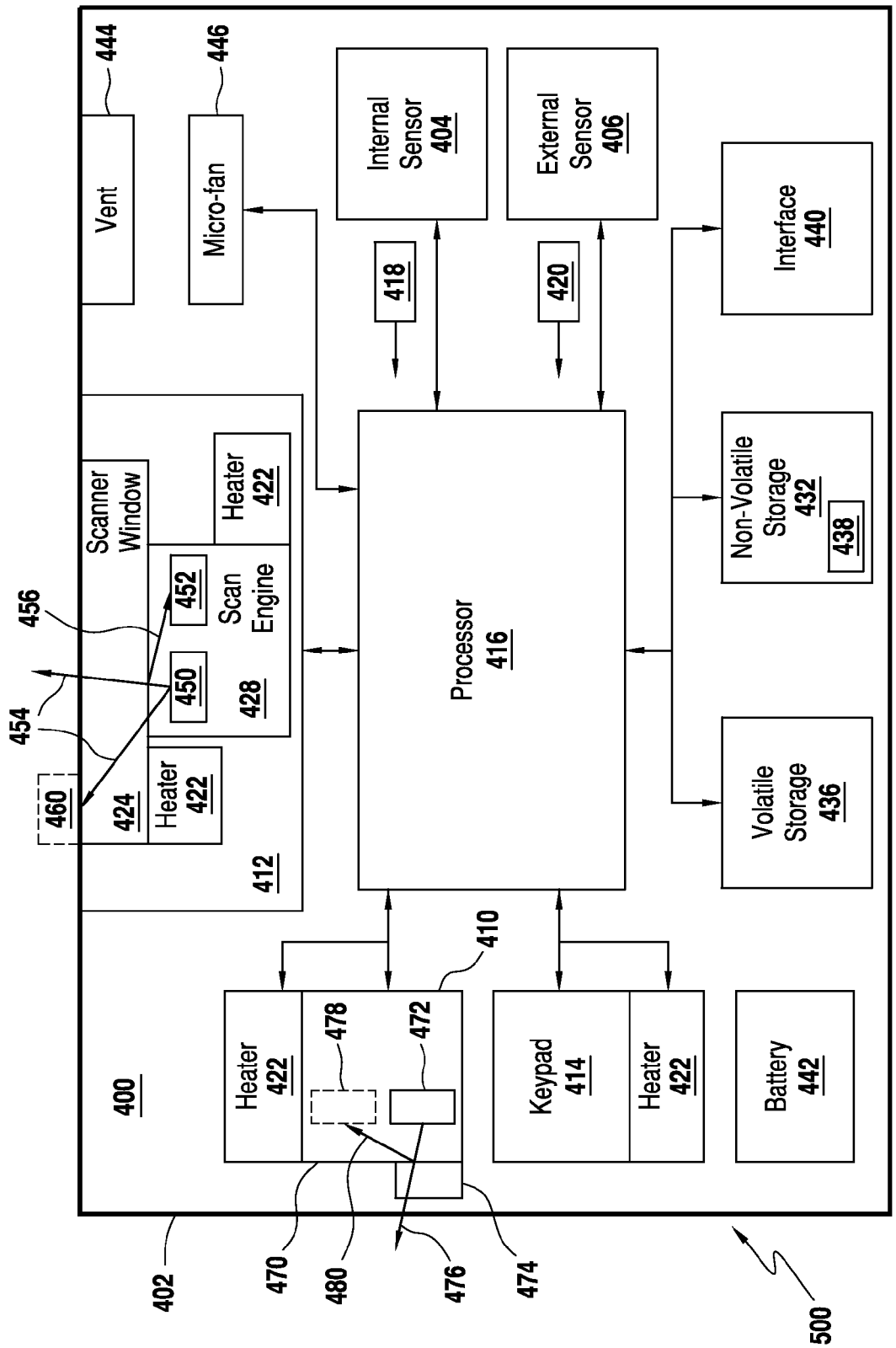
FIG. 5 depicts a block diagram of components of the mobile computer of FIG. 4.

FIG. 5 depicts a block diagram 500 of the mobile computer 400 of FIG. 4. The mobile computer 400 includes the internal sensor 404 and the external sensor 406. The internal sensor 404 and the external sensor 406 can include a combination of temperature sensors and humidity sensors. Additionally, mobile computer 400 can include a volatile memory 436, non-volatile memory 432, and an interface 440.

In some embodiments, other factors can be used by the processor 416 to determine when to activate the environmental control apparatus 408. For example, condensation forming on the scanner window 424 of the scanner 412 can be detected and used by the processor 416 to activate the environmental control apparatus 408. As previously described, the environmental control apparatus 408 can include one or more heaters 422 and/or one or more micro-fans 446 coupled to vent opening 444.

Several components of scanner 412 are illustrated in FIG. 5. For example, scanner 412 includes a light source 450 and an optical sensor 452 located behind scanner window 424. Light 454 is emitted from light source 450 to reflect from optically encoded data located in front of scanner window 424 for detection by optical sensor 452. When changes in temperature and/or humidity occur, scanner window 424 can fog and/or frost which causes backscatter 456 of light 454 from scanner window 424. The backscatter 456 can be detected by optical sensor 452, for example, as an increase in background noise. This background noise can be an indication of fogging due to a change in temperature and/or humidity. In one embodiment, the processor 416 can be configured to activate the environmental control apparatus 408 based on backscatter 456 of light from light source 450 from scanner window 424.

In one embodiment, when background noise exceeds a predetermined threshold value, the processor 416 can activate the environmental control apparatus 408, for a predetermined period of time and predetermined operating parameter, or until the background noise falls below the predetermined threshold value.

In another embodiment, the mobile computing device 400 can include an optical sensor 460 positioned to measure an opacity of scanner window 424 in response to detecting an intensity of light 454 passing through scanner window 424. As scanner window 424 fogs and/or frosts, its opacity decreases relative to a decrease in the intensity of light 454. Thus, when the intensity of light 454 decreases below a predetermined threshold value, the processor 416 can activate the environmental control apparatus 408. The environmental control apparatus 408 can be activated for a predetermined period of time and predetermined operating parameter, or until intensity of light 454 rises above the predetermined threshold value.

In another example, condensation forming on a display window 470 of the display 410 can be detected and used by the processor 416 to activate the environmental control apparatus 408. Several components of display 410 are illustrated in FIG. 5. For example, display 410 includes a light source 472, such as a back light on an LCD display, and an optical sensor 474 positioned to detect an intensity of light 476 emitted from light source 472 passing through the front window 470 of display 410 to sense opacity of window 470.

When changes in temperature and/or humidity occur, window 470 can fog and/or frost which can affect the opacity of the window 470. Thus, the opacity decreases in relation to the intensity of light 476. Hence, when the intensity of light 476 decreases below a predetermined threshold value, the processor 416 can activate the environmental control apparatus 408. The environmental control apparatus 408 can be activated for a predetermined period of time and predetermined operating parameter, or until intensity of light 476 rises above the predetermined threshold value.

In an alternative embodiment, an optical sensor 478 can be located behind window 470. When changes in temperature and/or humidity occur, window 470 can fog and/or frost which causes backscatter 480 of light 476 from window 470. The backscatter 480 can be detected by optical sensor 478, for example, as an increase in background noise. This background noise can be an indication of fogging due to a change in temperature and/or humidity. In one embodiment, the processor 416 can be configured to activate the environmental control apparatus 408 based on backscatter 480 of light from light source 472 from window 470. The environmental control apparatus 408 can be activated for a predetermined period of time and predetermined operating parameter, or until background noise falls below a predetermined threshold value.

Skilled artisans will appreciate that while only one micro-fan 446 is illustrated in FIG. 5, in practice any suitable number of micro-fans 446 can be used in any suitable configuration. For example, mobile computing device 400 can include a plurality of micro-fans 446 positioned in various locations inside the enclosure 402. Alternatively, device 400 can include one micro-fan 446 enabled to generally exchange air from an interior of the mobile computing device 400.

In operation, method 300 (FIG. 3) can be implemented in mobile computing device 400. At step 304, the processor 416 determines whether to activate environmental control apparatus 408, such as one or more heaters 422 and micro-fans 446. More specifically, the processor 416 can compare data 418, 420 to predetermined values and/or threshold values stored in data 438 to determine whether data 418 and/or data 420 meet a condition for activating environmental control apparatus 408, such as one or more heaters 122 and micro-fans 446. When one or more conditions are met in step 304, the processor 416 activates the environmental control apparatus 408 (step 306), such as one or more heaters 122 and micro-fans 446, based on internal environmental data 418 and external environmental data 420 to control an environment of one or more components of mobile computing device 400.

For example, a temperature and/or humidity change of sufficient magnitude can be determined either by comparing current data 418, 420 with historical data stored in data 438 and/or by comparing a difference between the exterior environment and the interior environment of the enclosure 402 of the device 400 to a predetermined threshold value. The processor 416 can activate one or more heaters 422 and/or micro-fans 446 to prevent a component of device 400 from fogging, frosting and/or freezing.

In some embodiments, one or more heaters 422 and micro-fans 446 can be activated simultaneously or at different times depending on specific environmental conditions. In yet other embodiments, one or more heaters 422 and micro-fans 446 can be activated in a given order. For example, micro-fan 446 can be activated first to exchange humid air from the interior of device 400, and then one or more heaters 422 can be activated before or after micro-fan 446 is deactivated. In this embodiment, the heaters 422 can be more efficient because they are heating a dryer interior of device 400. Thus, heaters 422 can be operated at a lower rate and/or temperature to reduce strain on battery 442 of device 400. The processor 416 can implement this process when the mobile computing device 400 moves from warm/humid environments to cold dry environments as sensed by internal sensor 404 and external sensor 406, thereby reducing the likelihood of a fogged display window 470, a fogged scan window 424 and/or a frozen keypad 414 of the mobile computing device 400.

While embodiments described herein are depicted with one internal 404 and one external environmental sensor 406, the number of environmental sensors is not to be considered limiting and any suitable number and type of environmental sensors is within the scope of present implementations, including but not limited to temperature sensors, humidity sensors, relative humidity sensors, barometers, and combinations thereof. The operation of the environmental control apparatus 408 can be based on any suitable combination of data from environmental sensors.

Further, while environmental sensors and environment control apparatus have been described with respect to temperature and humidity sensing and control, it is appreciated that any suitable type of environmental sensors and environment control apparatus are within the scope of present implementations, including but not limited to barometric pressure sensors and pressure control apparatus.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus described herein. The non-processor circuits may include, but are not limited to, a radio receiver, a radio transmitter, signal drivers, clock circuits, power source circuits, and user input devices. As such, these functions may be interpreted as steps of a method to perform the mutual authentication described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processor" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile computing device comprising:
   an enclosure;
   a humidity sensor for sensing humidity inside the enclosure and generating humidity data;
   an internal temperature sensor for sensing a temperature inside the enclosure and generating internal temperature data;
   an external temperature sensor for sensing a temperature exterior to the enclosure and generating external temperature data;
   an environmental control apparatus for adjusting at least a temperature inside the enclosure of the mobile electronic device;
   an optical scanner enabled to read optically encoded data, the optical scanner comprising a light source and an optical sensor located behind a scanner window; and
   a processor receiving the humidity data, the internal temperature data, and the external temperature data and activating the environmental control apparatus in response to a measure of backscatter of light emitted by the light source from the scanner window, the humidity data, the internal temperature data, and the external temperature data to minimize condensation from forming inside the enclosure due to rapid changes in the external temperature.

2. The mobile computing device of claim 1, wherein the environmental control apparatus comprises at least one heater.

3. The mobile computing device of claim 1, wherein the environmental control apparatus comprises at least one humidity control device.

4. The mobile computing device of claim 1, wherein the environmental control apparatus comprises at least one micro-fan for exchanging air inside the enclosure with air external to the enclosure.

5. The mobile computing device of claim 1, further comprising a display mechanically coupled to the enclosure.

6. The mobile computing device of claim 1, wherein the external temperature sensor is located at least partially within the enclosure.

7. The mobile computing device of claim 1, further comprising a memory for storing the humidity data, the internal temperature data, and the external temperature data.

8. The mobile computing device of claim 1, wherein the processor determines a dew-point temperature inside the enclosure using the humidity data and the internal temperature data.

9. The mobile computing device of claim 8, wherein an onset of condensation inside the enclosure is determined based on the dew-point temperature and the external temperature data.

10. The mobile computing device of claim 1, wherein the optical sensor is located for sensing an opacity of the scanner window, and wherein the processor is further enabled to activate the environmental control apparatus based on the sensed opacity of the scanner window.

11. A method of minimizing condensation from forming inside an enclosure of a mobile device, the method comprising:
   sensing a humidity inside the enclosure and generating humidity data;
   sensing a temperature inside the enclosure and generating internal temperature data;
   sensing a temperature exterior to the enclosure and generating external temperature data;
   measuring a backscatter of light emitted by a light source from a scanner window by an optical sensor of an optical scanner of the mobile device enabled to read optically encoded data;
   activating an environmental control apparatus in response to the measure of backscatter of light, the humidity data, the internal temperature data, and the external temperature data; and
   regulating the environmental control apparatus to adjust at least the temperature inside the enclosure to minimize condensation from forming inside the enclosure due to rapid changes in the external temperature.

12. The method of claim 11, wherein the environmental control apparatus comprises at least one heater.

13. The method of claim 11, wherein the environmental control apparatus comprises at least one humidity control device.

14. The method of claim 11, wherein the environmental control apparatus comprises at least one micro-fan for exchanging air inside the enclosure with air external to the enclosure.

15. The method of claim 11, further comprising storing the humidity data, the internal external temperature data, and the external temperature data.

16. The method of claim 11, further comprising determining a dew-point temperature inside the enclosure using the humidity data and the internal temperature data.

17. The method of claim 16, wherein an onset of condensation inside the enclosure is determined based on the dew-point temperature and the external temperature data.

18. The method of claim 11, wherein activating the environmental control apparatus and regulating the environmental control apparatus occurs in a feedback loop until the temperature inside the enclosure is adjusted to minimize condensation from forming inside the enclosure.

* * * * *